United States Patent
Macken

[15] 3,644,016
[45] Feb. 22, 1972

[54] OPTICAL ISOLATOR

[72] Inventor: John A. Macken, Orange, Calif.
[73] Assignee: North American Rockwell Corporation
[22] Filed: Mar. 19, 1968
[21] Appl. No.: 714,307

[52] U.S. Cl. ............................. 350/150, 350/157, 350/159, 356/112
[51] Int. Cl. ........................................................ G02f 1/26
[58] Field of Search ................. 350/150, 151, 155, 157, 159; 356/112; 331/94.5

[56] References Cited

UNITED STATES PATENTS

| | | | |
|---|---|---|---|
| 3,204,104 | 8/1965 | Baird et al. | 332/7.51 |
| 3,527,532 | 9/1970 | Macken | 356/4 |
| 3,484,151 | 12/1969 | Tarner | 350/159 |
| 3,239,671 | 3/1966 | Buhter | 350/150 |
| 3,277,392 | 10/1966 | Nicolai | 331/94.5 |
| 3,399,591 | 9/1968 | Drougard | 350/159 |

*Primary Examiner*—David Schonberg
*Assistant Examiner*—Michael J. Tokar
*Attorney*—L. Lee Humphries

[57] ABSTRACT

An optical isolator is constructed using a pair of rotating half-wave plates as the active elements. In a first embodiment, the rotating half-wave plates are arranged in series between a pair of linear polarizers, the spacing between the plates being adjusted to pass light travelling in one direction but not in the opposite direction. In a second embodiment, a Fabry-Perot interferometer is positioned between two rotating half-wave plates so as to pass circularly polarized light travelling in one direction but not in the opposite direction.

1 Claim, 6 Drawing Figures

INVENTOR.
JOHN A. MACKEN 3,644,016

OPTICAL ISOLATOR

BACKGROUND OF THE INVENTION

1. Field of the Invention

The present invention relates to optical isolators and, more particularly, to optical isolators which use rotating half-wave plates as the active elements thereof.

2. Description of the Prior Art

Ever since the invention of the laser, many practical uses have been proposed therefor based upon its inherent property of producing a high-intensity, highly collimated beam of light. For example, this property makes the laser extremely valuable in optical communication systems, in optical radar systems, in medicine, and, conceivably, as a weapon.

In many situations it is necessary or desirable to provide an optical isolator in the path of the laser beam so as to permit light to pass in one direction but not in an opposite direction. For example, in the construction of a laser radar, where a beam of light is transmitted in the direction of a target and where the reflected beam is detected by a receiver located adjacent the transmitter, it is necessary to prevent the return beam from being incident on the transmitter. If this is not prevented, the return beam acts as a low-amplitude modulator in the transmitting laser which manifests itself as a high-noise signal in the transmitter channel. The presence of this noise causes considerable difficulties in the processing apparatus. Therefore, there exists a need for an optical isolator to be placed in the path of the transmitted beam to permit the transmitted beam to pass in the direction of the target but to prevent the return beam from being incident on the transmitting laser.

At present, the only known method for making an optical isolator uses a Faraday cell with a sufficient magnetic field applied thereto to produce a 45° rotation of linearly polarized light. The Faraday cell is then placed between two linear polarizers which have their planes of polarization displaced by 45° with respect to each other. A light beam is passed through the first polarizer, then through the Faraday cell and then through the second polarizer. With a magnetic field sufficient to produce a 45° rotation of linearly polarized light applied to the Faraday cell, light entering the isolator can pass through the combination of polarizers and Faraday cell in one direction but not in the opposite direction. The direction of the magnetic field and the orientation of the polarizers determines which direction will be passed.

There are two serious disadvantages associated with the use of Faraday cells as optical isolators. In the first instance, Faraday cells only operate in the vicinity of an electronic absorption band. Thus, all Faraday cells absorb light. This is highly undesirable in that the Faraday optical isolator operates as an attenuator of the light beam, often requiring the addition of optical amplifiers. Secondly, the amount of magnetic field required to produce a 45° rotation of linearly polarized light becomes prohibitively large for the red and infrared portion of the spectrum. This is such a serious problem that there are wide portions of the infrared spectrum where optical isolators cannot be made using the Faraday rotation technique.

SUMMARY OF THE INVENTION

According to the present invention, there is provided a novel optical isolator which eliminates all of the problems hereinbefore discussed. The present optical isolator is operative to allow light to pass through in one direction but not in the opposite direction without the light loss associated with Faraday cells. In addition, the operation of the present optical isolator is independent of the frequency of the applied light so that it is equally useful over the entire spectrum.

According to the present invention, an optical isolator is constructed using a pair of mechanically rotating half-wave plates or a pair of electrooptic crystals with light passing down the threefold axis of symmetry, such crystals simulating rotating half-wave plates. Plane polarized light passing through a simulated rotating half-wave plate will emerge plane polarized but rotating, making two complete rotations for every rotation of the simulated half-wave plate. Such a device satisfies the basic requirement for the active element in an optical isolator; namely, it is an element that influences light in a different way when the direction of the light is reversed. Plane-polarized light entering such a device will emerge plane polarized and rotating clockwise when passed through in one direction but rotating counterclockwise when passed through in the opposite direction. Another feature of the same device is that circularly polarized light will be shifted up in frequency when passed through in one direction and shifted down in frequency when passed through in the opposite direction. This latter feature permits the construction of a device which will permit circularly polarized light of one frequency to pass in a first direction and circularly polarized light of another frequency to pass in an opposite direction.

In a first embodiment of the present invention, using linearly polarized light, by properly spacing a pair of electro-optic crystals, an optical isolator can be constructed. In a second embodiment, using circularly polarized light, by placing a Fabry-Perot interferometer which will discriminate between two closely spaced light frequencies, between two electro-optic crystals, an effective optical isolator may be constructed.

OBJECTS

It is therefore an object of the present invention to provide a novel optical isolator.

It is a further object of the present invention to provide an optical isolator which will not absorb light passing therethrough.

It is a still further object of the present invention to provide an optical isolator which operates independently of the frequency of the light beam and may be used over the entire spectrum.

It is another object of the present invention to provide an optical isolator using electro-optic crystals.

It is still another object of the present invention to provide an optical isolator using electro-optic crystals spaced by a predetermined distance.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

Figure 1:
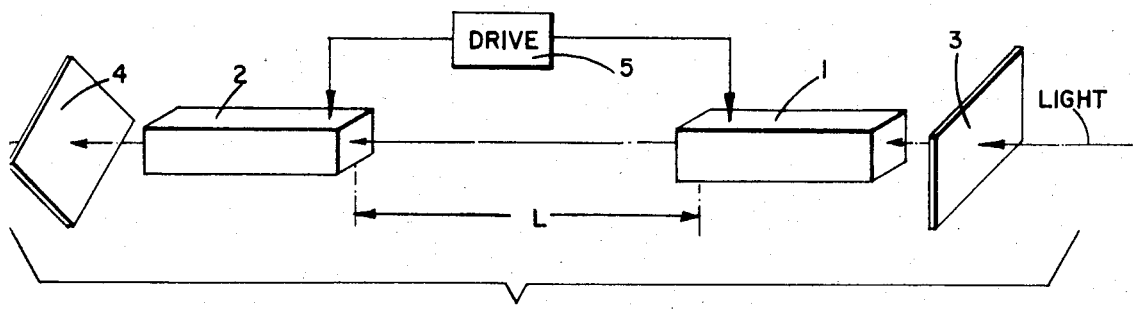
FIG. 1 shows the optical layout of a first embodiment of the present invention which uses a pair of spaced electro-optic crystals capable of simulating rotating half-wave plates and a pair of linear polarizers.

For the purpose of this discussion, reference will be made to rotating half-wave plates. However, it is to be understood that a plate which exhibits an odd multiple of half-wave retardations, such as one and one-half wave plate, two and one-half wave plate, etc., exhibits the same properties as those attributed to a half-wave plate. Also, all such references are not limited to the mechanical rotation of a device which produces a half-wave retardation between two mutually perpendicular plane polarized beams of light, but include the simulation of a rotating half-wave plate by the application of a rotating electric field to a stationary electro-optic crystal so as to produce the same birefringent rotation characteristic of a rotating half-wave plate. Such electro-optic crystals, in which a polarized light beam transmitted therethrough parallel to the threefold axis of symmetry and in which an electric field is rotated about the axis in a plane normal to the axis of symmetry, are described in U.S. Pat. No. 3,204,104 and my copending U.S. Pat. application Ser. No. 650,943, entitled Digital Optical Frequency Shifter, filed July 3, 1967. With four or more electrodes positioned on the sides of such a crystal and a driving signal of proper phase applied to each electrode, it is possible to obtain the effect of a rotating electric field in the crystal so as to simulate a rotating half-wave plate. However, because of the properties of linear electro-optic crystals, the simulated rotating half-wave plate rotates in the opposite direction and at half the rotational frequency as the rotating electric field. Therefore, in order to simulate a rotating half-wave plate with an electro-optic crystal which will rotate at the same frequency as a mechanically rotating half-wave plate, the drive frequency for the crystal must be twice the rotational frequency of the mechanical half-wave plate and in the opposite direction. In any event, plane-polarized light passing through a rotating half-wave plate, whether it be a mechanical half-wave plate or an electro-optic simulation thereof, will emerge plane polarized but rotating, making two complete rotations for every rotation of the rotating half-wave plate.

According to the present invention a mechanically rotating half-wave plate or an electro-optic simulation thereof may be used to construct an optical isolator since the rotating half-wave plate satisfies the basic requirement for the active element in such an optical isolator; namely, it is an element that influences light in a different way when the direction of the light is reversed. In the present case, it is a rotating half-wave plate which is influencing the light, and it is apparent that any rotating element does not look the same when viewed from opposite directions. From one direction, the rotating field is rotating in a clockwise direction, while when viewed from the opposite direction, the same rotating field appears to be rotating counterclockwise. Plane-polarized light entering such a device will emerge plane polarized and rotating in the same direction as the direction of rotation of the simulated rotating half-wave plate. Thus, plane-polarized light entering an electro-optic crystal constructed as previously described with a rotating electric field applied thereto will emerge rotating clockwise when passing through the crystal from one direction and rotating counterclockwise when passing through the crystal from the opposite direction.

Referring now to the drawings and, more particularly, to FIG 1 thereof, there is shown a first embodiment of the present invention which operates on the principle that plane-polarized light emerges rotating different directions when passed through a mechanically rotating half-wave plate or an electro-optic simulation thereof. In the embodiment of FIG. 1, first and second electro-optic crystals 1 and 2 are placed in series between first and second linear polarizers 3 and 4. A common drive source 5 is used to drive crystals 1 and 2 at the same frequency.

According to the present invention, the spacing L between the simulated rotating half-wave plate is accurately adjusted according to the formula:

$$L = C/16F + NC/4F \quad (1)$$

where
$C$ = speed of light,
$F$ = frequency of rotation of the simulated half-wave plate, and
$N$ = any integer including zero.

Because of the before-mentioned properties of linear electro-optic crystals, the rotational frequency of the simulated half-wave plate is only half the driving frequency. Thus, equation (1) could be re-written:

$$L = C/8F_D + NC/2F_D \quad (2)$$

where $F_D$ = the electrical driving frequency.

For example, with an electrical driving frequency of 50 mHz., the separation of the two crystals would be 30 inches for $N=0$. The spacing between crystals 1 and 2 is selected so as to permit the simulated rotating half-wave plate to rotate 22½° $+N90°$ in the time it takes light to travel between the two crystals. It is obvious that the spacing between crystals 1 and 2 is a minimum when $N=0$, equations (1) and (2) reducing to:

$$L = \frac{C}{16F} \quad (3)$$

and $$L = \frac{C}{8F_D} \quad (4)$$

The following discussion will assume $N=0$.

Figure 2:
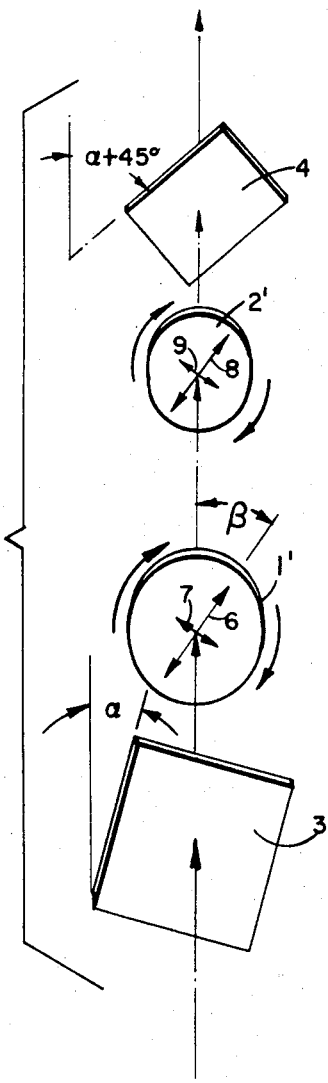
FIG. 2 is a schematic representation of the embodiment of FIG. 1 for light travelling from right to left, the electro-optic crystals being shown merely as mechanically rotating half-wave plates.

To fully understand how it is possible to reject light going in one direction and yet transmit light travelling in the other direction using such a technique, reference is made first to FIG. 2 where crystals 1 and 2 have been drawn as mechanically rotating half-wave plates 1' and 2' solely for purpose of explanation. Light travelling from right to left in FIG. 1 enters linear polarizer 3 which is oriented to give an arbitrary polarization angle $\alpha$. The linearly polarized light emergent from polarizer 3 then passes through rotating half-wave plate 1' which, for the purpose of the present discussion, has a fast axis 6 and a slow axis 7, both of which are rotating with half-wave plate 1'. The light emergent from half-wave plate 1' is still linearly polarized but its plane of polarization is dependent on the orientation of half-wave plate 1'. More particularly, the polarization angle $\alpha'$ of the plane-polarized light emergent from rotating half-wave plate 1' is given by the formula:

$$\alpha' = 2\beta - \alpha \quad (5)$$

where $\beta$ = the instantaneous angle of the fast axis of half-wave plate 1'.

The light beam emergent from rotating half-wave plate 1' then traverses the distance L and is incident on rotating half-wave plate 2' having a fast axis 8 and a slow axis 9, both of which are rotating. Since both half-wave plates 1' and 2' are driven by the same drive source 5, both have their fast axes rotating at the same speed. In addition, it will be assumed that the fast axes of plates 1' and 2' are oriented in the same direction at any given time. However, the spacing between rotating half-wave plates 1' and 2' is such as to permit a 22½° rotation of this orientation in the time it takes light to travel the distance between the two half-wave plates. In the example shown in FIG. 2, this rotation is clockwise and thus, the angular addition will be considered positive. Half-wave plate 2' is thus oriented at an angle $\beta' = \beta + 22½°$ by the time the light emergent from half-wave plate 1' reaches it. If $\alpha''$ is the polarization angle of light emergent from rotating half-wave plate 2', $\alpha''$ is given by the equation:

$$\alpha'' = 2\beta' - \alpha' \quad (6)$$

where $\beta'$ = the instantaneous angle of the fast axis of second half-wave plate 2', i.e., $\beta + 22½°$. Substituting for $\alpha'$ and $\beta'$:

$$\alpha'' = 2(\beta + 22½) - (2\beta - \alpha)$$
$$= 2\beta + 45 - 2\beta + \alpha$$
$$= 45° + \alpha.$$

If linear polarizer 4 is oriented at an angle equal to $\alpha + 45°$, it will transmit the light emergent from rotating half-wave plate 2'.

Figure 3:
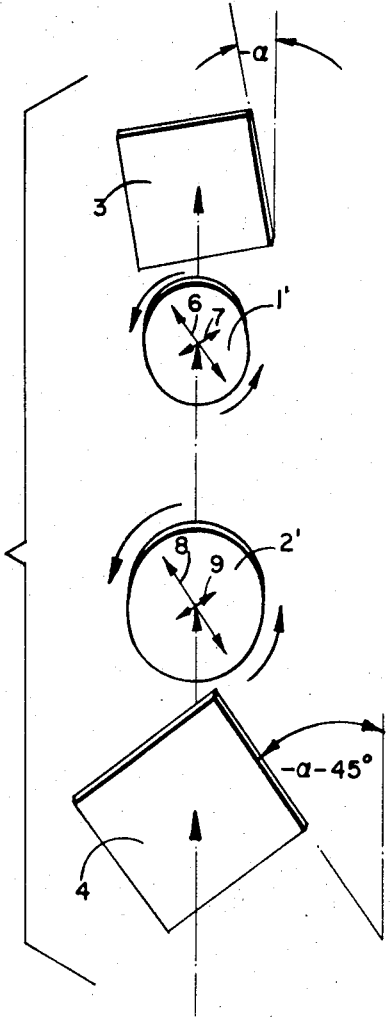
FIG. 3 is a schematic representation of the embodiment of FIG. 1 for light travelling from left to right, the electro-optic crystals being shown as in FIG. 2.

Referring now to FIG 3, there is illustrated schematically the case where light passes from left to right in FIG. 1. It should be noted that in FIG. 3, in reversing the frame of reference, the angles which were positive in FIG. 2 will be negative from the new orientation. In addition, the direction of rotation of half-wave plates 1' and 2' appears to be counterclockwise from this new vantage point.

Retracing a ray through the system, it first passes through polarizer 4 and is polarized at an angle $\alpha_o = -\alpha - 45°$. The light then passes through half-wave plate 2' and emerges oriented at an angle $\alpha'$ where, $$\alpha' = 2\beta - \alpha_o \quad (7)$$
$$= 2\beta - (-\alpha - 45°)$$
$$= 2\beta + \alpha + 45°.$$

By the time the light reaches rotating half-wave plate 1', there has been an additional rotation of $-22\frac{1}{2}°$ (counterclockwise rotation). Thus, half-wave plate 1' will be oriented at $\beta' = \beta - 22\frac{1}{2}°$ and polarized light oriented at $2\beta + \alpha + 45°$ entering this half-wave plate will emerge oriented at an angle $\alpha''$ where, $$\alpha'' = 2\beta' - \alpha' \quad (8)$$
$$= 2(\beta - 22\frac{1}{2}) - (2\beta + \alpha + 45)$$
$$= 2\beta - 45 - 2\beta - \alpha - 45$$
$$= -\alpha - 90°.$$

Thus, when this light strikes polarizer 3 oriented at $-\alpha$, it will not be transmitted.

Although in the present example it has been assumed that both half-wave plates 1' and 2' have their fast axes oriented in the same direction at any given time, it will be obvious to those skilled in the art that such need not be the case. If the fast axis of rotating half-wave plate 2' is advanced by an arbitrary angle $\gamma$, with respect to the fast axis of rotating half-wave plate 1', this may be readily compensated for by positioning linear polarizer 4 at an angle equal to $\alpha + 45° + 2\gamma$ where $\alpha$ is as previously defined.

It can therefore be seen that in accordance with the present invention there is provided an optical isolator since light transmitted from right to left in FIG. 1 will be transmitted through the device without loss, whereas light passing from left to right in FIG. 1 will be completely rejected. In addition, linearly polarized light entering the device of FIG. 1 will exit linearly polarized, the only difference between the input and output being that the direction of polarization has been changed by 45°.

Figure 4:
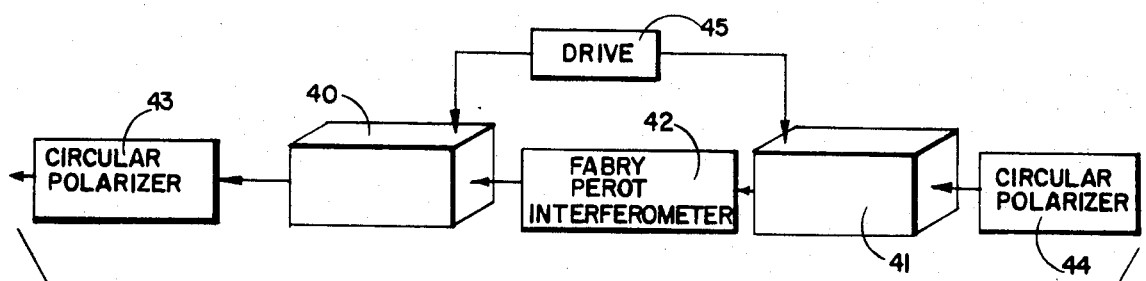
FIG. 4 shows the optical layout of a second embodiment of the present invention which uses circularly polarized light.

Referring now to FIG. 4, there is shown a second embodiment of the present invention which uses a pair of electro-optic crystals 40 and 41 operating to simulate rotating half-wave plates. In the embodiment of FIG. 4, the property made use of is the fact that circularly polarized light passing through a rotating half-wave plate will be shifted up in frequency when transmitted through in one direction and shifted down in frequency when the direction is reversed. In the present embodiment, the rejection mechanism is a Fabry-Perot interferometer 42 positioned between crystals 40 and 41. Such a device has the ability of discriminating between two closely spaced light frequencies, transmitting one and reflecting the other. A Fabry-Perot interferometer is merely two semitransmitting reflectors aligned so that they are parallel if they are flat or aligned to have a common axis if they are spherical.

In the explanation of the present embodiment, let $\omega$ equal the rotation rate of the input light beam and $\Omega$ equal the rotation rate of the half-wave plates simulated by crystals 40 and 41 which are driven by a common drive source 45. Clockwise rotations are considered positive and counterclockwise rotations negative. In addition, in FIG. 4, a pair of circular polarizers 43 and 44 are positioned at the input and output ends of the optical isolator.

Figure 5:
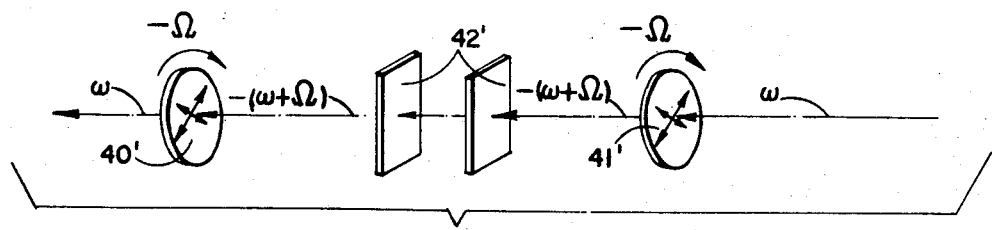
FIG 5 is a schematic representation of the embodiment of FIG. 4 for light travelling from right to left, the electro-optic crystals being shown as in FIGS. 2 and 3.

Referring to FIG. 5, there is shown the effect of light passing from right to left in FIG. 4, electro-optic crystals 40 and 41 being shown schematically as mechanically rotating half-wave plates 40' and 41' and Fabry-Perot interferometer 42 being shown simply as two reflectors 42'. Circularly polarized light having a rotation rate $\omega$ passes through rotating half-wave plates 41' which has a rotation rate $-\Omega$ and emerges with a rotation rate $-\omega - \Omega$ or $-(\omega + \Omega)$. This signifies that the direction of rotation of the light has been reversed and the frequency of the light has been shifted up. For the purposes of this example, let us assume that Fabry-Perot interferometer 42' has a mirror spacing and mirror reflectivity to transmit light shifted up in frequency to $\omega + \Omega$ but to reflect light shifted down in frequency to $\omega - \Omega$. Thus, for this example, the light is transmitted through Fabry-Perot interferometer 42' and enters rotating half-wave plate 40' which is also rotating at a rate of $-\Omega$. This light emerges from rotating half-wave plate 40' with a rotation rate of $\omega$, and thus, has been shifted back to its original frequency and direction of rotation.

Figure 6:
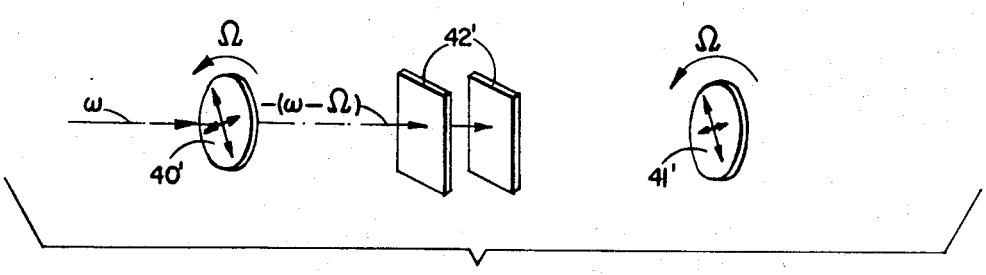
FIG. 6 is a schematic representation of the embodiment of FIG. 4 for light travelling from left to right, the electro-optic crystals being shown as in FIG. 5.

Referring now to FIG. 6, there is shown the effect of light passing from left to right in FIG. 4. Circularly polarized light entering rotating half-wave plates 40' and 41' from the opposite direction sees the rotating half-wave plates rotating in the opposite direction, i.e., clockwise, thus, their rate is $+\Omega$. As a result, circularly polarized light having a rotation rate $\omega$ passing through rotating half-wave plate 40' emerges with a rotation rate of $-\omega + \Omega$ or $-(\omega - \Omega)$. Therefore, the light has been shifted down in frequency and will be reflected by Fabry-Perot interferometer 42'. In this manner, an optical isolator is provided. In addition, it will be obvious to those skilled in the art that such a construction will permit circularly polarized light of one frequency to pass in a first direction and circularly polarized light of another frequency to pass in an opposite direction.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. An optical isolator for permitting a circularly polarized beam of light to pass in one direction but not in an opposite direction, the rotation rate of said beam of light being equal to $\omega$, comprising, in combination:

first and second rotating half-wave plates positioned in series in the path of said light beam, said first and second rotating half-wave plates being driven in the same direction and at the same rotation rate equal to $\Omega$; and a Fabry-Perot interferometer positioned between said first and second rotating half-wave plates in the path of said light beam for passing light with a rotation rate of $\omega + \Omega$ and reflecting light with a rotation rate of $\omega - \Omega$.

\* \* \* \* \*